US009626442B1

(12) United States Patent
Bunker et al.

(10) Patent No.: US 9,626,442 B1
(45) Date of Patent: Apr. 18, 2017

(54) SYSTEM AND METHOD FOR A CUSTOMER CARE DOCUMENT MANAGEMENT SYSTEM

(71) Applicant: Sprint Communications Company L.P., Overland Park, KS (US)

(72) Inventors: Sarah R. Bunker, Overland Park, KS (US); Shelly M. Clark, Kansas City, MO (US); John R. Glenn, Overland Park, KS (US); Stephanie Tuller, Oklahoma City, OK (US)

(73) Assignee: Sprint Communications Company L.P., Overland Park, KS (US)

( * ) Notice: Subject to any disclaimer, the term of this patent is extended or adjusted under 35 U.S.C. 154(b) by 385 days.

(21) Appl. No.: 14/271,449

(22) Filed: May 6, 2014

(51) Int. Cl.
*G06F 17/30* (2006.01)
*G06Q 30/00* (2012.01)

(52) U.S. Cl.
CPC ..... *G06F 17/30864* (2013.01); *G06Q 30/016* (2013.01)

(58) Field of Classification Search
CPC ............................ G06Q 30/016; G06F 9/4446
USPC ........................................................ 715/714
See application file for complete search history.

(56) References Cited

U.S. PATENT DOCUMENTS

| 2012/0150632 A1* | 6/2012 | Fan | G06Q 30/016 705/14.49 |
| 2012/0179677 A1* | 7/2012 | Roselli | G06Q 10/10 707/736 |
| 2014/0052645 A1* | 2/2014 | Hawes | G06Q 10/20 705/304 |
| 2015/0269586 A1* | 9/2015 | Garia | G06Q 30/016 705/304 |

\* cited by examiner

*Primary Examiner* — Robert Beausoliel, Jr.
*Assistant Examiner* — Nirav K Khakhar (57) ABSTRACT

A customer care knowledge management system. The system comprises a server computer comprising more than one search engine, configured to search an answer to the problem in the document, in a social community, and in at least one external website, wherein a social community is a computer managed online social community. The server computer further comprises a user interface server application, configured to combine search results from the more than one search engine, attach relevant discussions in a social community to the document, wherein a discussion is an aggregation of comments, replies, or posts on a topic, issue, or subject matter, filter at least some search results based on a profile of a customer care agent and the type of the problem, and notify at least one subject matter expert of the problem if no answer is found.

19 Claims, 5 Drawing Sheets

SYSTEM AND METHOD FOR A CUSTOMER CARE DOCUMENT MANAGEMENT SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of portable electronic devices such as tablets, laptop computers, personal digital assistants (PDAs), as well as mobile phones and smart phones may encounter use and/or functionality issues with their devices or with the systems and services that both support and are accessed by those devices. In the event that a service or device problem arises, a user can contact and communicate with customer care regarding the problem experienced. During the course of this interaction, the customer care representative may troubleshoot the device or service directly or indirectly, depending on the type of problem reported and the available troubleshooting solutions.

SUMMARY

In an embodiment, a customer care knowledge management system is disclosed. The system comprises a workstation, comprising a user interface application that locates a document based on input of at least one keyword from a problem raised by a customer, displays filtered search results to the problem in an order that is determined based on weights and priorities of the search results, and displays a notification in case of a new answer to the problem. The system further comprises a server computer, comprising more than one search engine, configured to search an answer to the problem in the document, in a social community, and in at least one external website, wherein a social community is a computer managed online social community. The server computer further comprises a user interface server application, configured to combine search results from the more than one search engine, attach relevant discussions in a social community to the document, wherein a discussion is an aggregation of comments, replies, or posts about a topic, an issue, or a subject matter, filter at least some search results based on a profile of a customer care agent and the type of the problem, and notify at least one subject matter expert of the problem if no answer is found.

In an embodiment, a method of managing knowledge for a customer care system is disclosed. The method comprises locating a document based on at least one keyword from a question entered into the customer care system, wherein a document is a searchable and annotatable electronic document, entering, by a customer care agent, the question into the document, and searching an answer to the question in the document, in a social community, and in at least one external website with more than one search engine. The method further comprises attaching relevant discussions on the social community to the document, wherein a discussion is an aggregation of comments, replies, or posts about a topic, an issue, or a subject matter, exposing the discussions to viewers in a knowledge community, filtering at least some search results based on a profile of the customer care agent and the type of the question, and displaying, by a user interface, the filtered search results in an order that is determined based on weights and priorities of the search results. The method further comprises flagging answers to the question, notifying at least one subject matter expert of the question if no answer is found, displaying a notification to the customer care agent by the user interface in response to receiving a new answer to the question, generating a spreadsheet, by a management tool, for moderators to manage and prioritize work, and identifying and reporting customer care agents that contribute to a knowledge management system.

In an embodiment, a method of dynamically searching for content in a customer care system is disclosed. The method comprises finding a document based on at least one keyword from an input question, searching an answer to the question in the document, in a social community, and in at least one external website with more than one search engine, wherein a social community is a computer managed online social community, attaching relevant discussions on the social community to the document, wherein a discussion is an aggregation of comments, replies, or posts about a topic, an issue, or a subject matter, and exposing the discussions to viewers in a knowledge community. The method further comprises filtering at least some search results based on a profile of a customer care agent and the type of the question, displaying, by a user interface, the filtered search results in an order that is determined based on weights and priorities of the search results, flagging answers to the question, and displaying a notification in case of a new answer to the question.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Content at different locations in a customer care system or among different departments of an organization may not be shared within current customer care systems. Problems may occur because the content is not integrated or shared under these circumstances. It is desirable to conquer the challenge of integrating and coordinating multiple efforts by multiple different groups helping customers with multiple different tools to create a more cohesive and comprehensible solution set. The present disclosure teaches a system and method for integrating content and managing knowledge in a customer care system.

For example, a document may be created for a topic. The document herein may be an electronic document that comprises electronic media content, for example text in electronic format. The document may be intended to be used in either an electronic form or as printed output. The document may be created, viewed, edited, or deleted through a software tool. Relevant content may be attached to the document, for example an audio clip, a video clip, or another piece of content. When a customer calls a customer care system and raises a problem or a question to a customer care agent or asks for help, the agent may use a system to search for a relevant document via a user interface on a computer based on keyword(s) from the question. For example, when a customer encounters use and/or functionality issues with his or her device or with the systems and services that both support and are accessed by that device, the customer may contact customer care. The device may be a portable electronic device such as a tablet, a laptop computer, a personal digital assistant (PDA), a mobile phone, or a smart phone. The question may be a question regarding the device or the system/service that supports the device. Additionally, the question may also be an issue that the customer encounters with the device or the system that supports the device, for example a system of a communications service provider. The customer care agent may troubleshoot the device or service directly or indirectly, depending on the type of issue reported and the available troubleshooting solutions. The user interface of the system used by the customer care agent may comprise a client side social community tool. The document may be visible to viewers in a knowledge system and may be edited by authorized viewers. The document may be created, viewed, and edited through the social community tool. Questions may be posted through the social community tool and comments may be read through the social community tool. A social community herein may refer to an online social community, for example, an internal online social community maintained by the communications service provider, an external online social community maintained by the communications service provider, an online forum, or another type of online social community. The communications service provider may host an internal social community that is available to employees of the communications service provider and may be partially available to viewers outside the communications service provider organization. The social community tool may be a function provided by the customer care system to view or post content on the social community.

When no relevant document is found, the agent may create a document based on the question. When a relevant document is found, the agent may enter the question into the document to search for an answer. The question may be transmitted to a user interface server application on a server computer with a request to search for an answer to the question. At least one search engine may be utilized by the user interface server application to search across a variety of sources, for example across a social community, across at least one data store, and across a variety of websites. For example, at least one external website may be searched by the at least one search engine. The external website may be a website from a partner, a vendor, or another organization. Similar questions may have been asked and answers may have been provided on the external websites. Thus, although it may be challenging to promote searching for answers on external websites, the results may be beneficial.

Search results may be filtered by the user interface server application based on source, relevance, and correctness. For example, answers provided by a member from a knowledge management team may be granted top priority. Answers provided by staff outside the knowledge management team but marked as correct may be granted priority. Search results with highest priority are displayed first, and search results with lowest priority are displayed last. Answers marked as correct or helpful may be validated by relevant personnel, for example a subject matter expert. Customer care agents that contribute to the knowledge management system may be rewarded with virtual badges.

If no correct answer is found and no discussion is found on the social community related to the question, the agent may start a discussion on the social community on the topic of the question, for example with a subject matter expert. A discussion may refer to an aggregation of comments, replies, or posts on a topic, issue, or subject matter herein. The comments, replies, or posts of the same discussion may be displayed in a predefined order, such as a temporal order, for example from the latest to the oldest or from the oldest to the latest. The discussion may be attached to the document. The agent may further subscribe to the discussion, for example by clicking on a subscribe button on the social community tool, when the question is not solved at the end of the voice session with the customer. If a discussion is found on the social community related to the question but no correct answer is found, the agent may also subscribe to the discussion. By subscribing to a discussion, the customer care agent may receive a notice when a new reply or a new comment is posted to the discussion.

When a new reply is posted to the discussion, the agent may receive a notification with a link to the new reply. For example, a second customer care agent may have experience with the topic and may post a new reply to the topic. The agent may click on the link and examine new posts to the discussion. New posts since the last visit of the agent to the discussion may be identified and displayed with a mark. A spreadsheet may be generated by a management tool for moderators to manage and prioritize work. The spreadsheet may comprise statistics and specific information on solved questions and unsolved questions of different categories and of different priority levels. Moderators from different departments may determine which questions to work on first based on the information on the spreadsheet.

Figure 1:
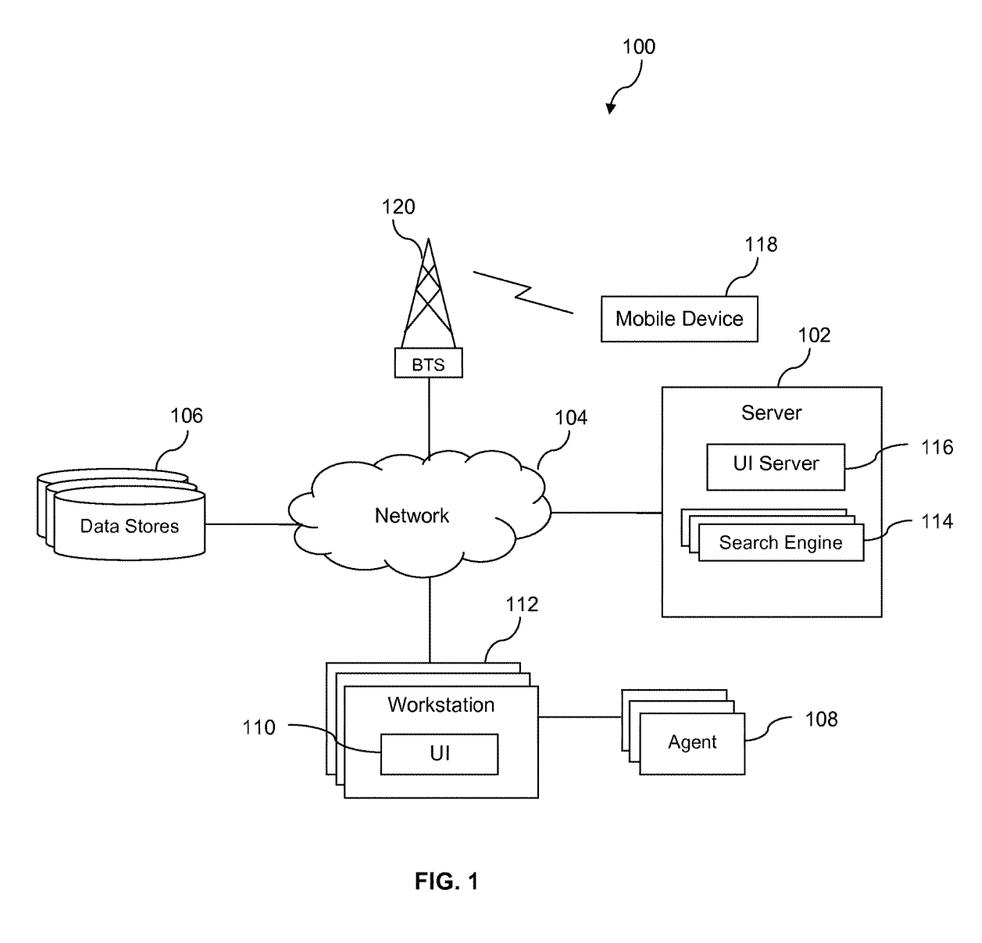
FIG. 1 is an illustration of a communication system according to an embodiment of the disclosure.

Turning now to FIG. 1, a communication system 100 is described. In an embodiment, the communication system 100 comprises a server computer 102, a plurality of workstations 112, a plurality of mobile communication devices 118, a plurality of customer care agents 108, and a plurality of data stores 106. The mobile device 118 is configured to use a radio transceiver to establish a wireless communication link with a base transceiver station (BTS) 120, and the base transceiver station 120 provides communications connectivity of the device 118 to a network 104. The server 102 may comprise a user interface server application 116 and a plurality of search engine applications 114. The workstation 112 may comprise a user interface application 110. The server computer 102, the workstation 112, the customer care agents 108, and the data stores 106 may also have access to the network 104.

The server computer 102, the workstation 112, the customer care agents 108, and the data stores 106 may access the network 104 through wired or wireless access networks. The network 104 may comprise one or more public networks, one or more private networks, or a combination thereof.

It is understood that the system 100 may comprise any number of servers 102, any number of mobile devices 118, any number of agents 108, any number of data stores 106, and any number of workstations 112. The server computer 102 and the workstation 112 may be any of a desktop computer, a server computer, or another network capable device. The mobile device 118 may be any of a mobile phone, a personal digital assistant (PDA), a media player, a laptop computer, a tablet computer, a notebook computer, or another network/communications capable device. The workstation 112 and the server 102 may communicate through a private internal network and/or public external network. The server 102 and the data stores 106 may communicate through a public external network.

The user interface server application 116 and the search engines 114 may locate in one computer—for example, a server computer, in two different computers—for example, a server computer for the user interface server application 116, and another computer for the search engines 114, in multiple different computers—for example, multiple server computers for the user interface server application 116, and other multiple computers for the search engines 114, or in some other combination of computers.

In an embodiment, the data stores 106 may store relevant information for answer(s) to questions or problems raised by callers to a customer care system, for example a customer care system maintained by a communications service provider to provide help and assistance to communications service subscribers. The caller may be a communications service subscriber with the mobile device 118. The data store 106 may be an internal data store of the communications service provider, for example an i-Share document data store. Alternatively, the data store 106 may be an external data store of the communications service provider. For example, the data store 106 may be a Kana data store, a WDS data store, a device known issue data store, or another type of external data store. When a caller calls the customer care system and raises a question or asks for help, a customer care agent 108 may locate a document with the user interface 110. The document herein may be an electronic document that comprises electronic media content, for example text in electronic format. The document may be intended to be used in either an electronic form or as printed output. The document may be created, viewed, edited, or deleted through a software tool, for example the user interface 110. Relevant content may be attached to the document, for example an audio clip, a video clip, or another piece of content.

The customer care agent 108 may search the document for the question, for example by entering keyword(s) from the question. The user interface server application 116 may search with the question or the keyword(s) across the document. The user interface server application 116 may also search through the data stores 106 and/or a social community. A social community herein may refer to an online social community, for example an internal online social community maintained by the communications service provider, an external online social community maintained by the communications service provider, an online forum, or another type of online social community. The communications service provider may host an internal social community that is available to employees of the communications service provider and may be partially available to viewers outside the communications service provider organization, for example i-Share from Sprint®.

The user interface application 110 may be a client side application that communicates and/or operates with the user interface server application 116. The user interface application 110 may comprise a client side social community tool. The client side social community tool may be a function provided by the customer care system to view or post content on the social community. For example, the user interface application 110 may comprise an i-Share user interface. The user interface application 110 may be stored in a memory of the workstation 112. When executed by a processor of the workstation 112, the user interface application 110 may operate as an interface portal for the agent 108. For example, the user interface application 110 may display relevant information to the agent 108. Additionally, the user interface application 110 may transmit inputs from the agent 108 to the user interface server application 116.

For example, the user interface 110 may locate a document, for example in an internal data store 106, based on keyword(s) from the question raised by the caller. If no relevant document is found, a document on the topic of the question may be created by the agent 108 with the user interface 110. A topic may comprise at least one key word from the question or problem raised by a customer. For example, if a question from a customer is "how do I set up WiFi on a Samsung galaxy s4 smart phone?", a topic may be called set up WiFi on a Samsung galaxy s4 smart phone. A topic and a discussion may be used interchangeably herein.

A discussion may refer to an aggregation of comments, replies, or posts on a topic, issue, or subject matter herein. The comments, replies, or posts of the same discussion may be displayed in a predefined order, such as a temporal order, for example from the latest to the oldest or from the oldest to the latest. The document may be viewed and/or edited through the user interface 110. Questions and/or comments may be posted to the topic through the user interface 110. Questions and/or comments under the same topic may be read through the user interface 110. The agent 108 may then enter the question into the document via the user interface 110. The user interface 110 may send a request to the user interface server application 116 with the question. The user interface 110 may request the user interface server application 116 to search for answer(s) to the question in the document.

When the user interface server application 116 receives the request from the user interface 110, the user interface server application 116 may utilize the search engines 114 to search for answer(s) to the question in the document. The user interface server application 116 may transmit search results to the user interface 110 when the search is complete. The search results may be filtered and the user interface 110 may display the filtered search results to the agent 108. The filtered search results may be displayed in an order that is determined by the user interface server application 116. For example, prioritized search results may be displayed first. Search results from various sources may be displayed with various icons. For example, a search result from a knowledge management team member may be displayed with an icon for the knowledge management team.

When a discussion relevant to the question is found on the social community, the agent 108 may subscribe to the discussion via the user interface 110. Alternatively, when no relevant discussion is found and a new discussion is created for the question on the social community, the agent 108 may also subscribe to the discussion via the user interface 110. When a new reply is posted to the discussion, the user interface server application 116 may send a notice to the user interface 110 with a link to the new reply. The user interface 110 may display the notice to the agent 108, for example with the link to the discussion on the social community. When the agent 108 clicks on the link to examine the new reply to the discussion, new posts of the discussion since the last visit of the agent 108 may be identified and displayed, for example with a mark, by the user interface 110.

In an embodiment, the search engine application 114 may be stored in a memory of the server 102. When executed by a processor of the server 102, the search engine 114 may be utilized by the user interface server application 116 to search for answers to questions raised by callers to the customer care system. For example, the search engines 114 may be a Kana search engine, an i-Share search engine, or another search engine. The search engines 114 may be configured to search across a variety of sources, for example across data stores 106 and/or across companies. For example, the search engine 114 may search within the document located by the user interface 110. The search engine 114 may search across a variety of the data stores 106. Additionally, the search engine 114 may search across internal and/or external websites. For example, if a question regarding a Samsung smartphone is raised by a caller, both the communications service provider's website and Samsung's website may be searched for potential answers.

The user interface server application 116 on the server computer 102 may communicate with the user interface 110 on the client workstation 112, conduct computing functions, and transmit computing results to the user interface 110. In an embodiment, the user interface server application 116 may be a customer service tool (CST) user interface server application. The user interface server application 116 may combine search results from the search engines 114. The user interface server application 116 may filter the search results based on predefined rules, for example based on a profile of the corresponding agent 108 that handles the question and/or the type of the question. For example, if a question is related to an Android phone, search results regarding iPhones may be filtered out.

A piece of content, for example an audio clip, a video clip, a file, or another piece of content, may be attached to the document found through the user interface 110. For example, the user interface server application 116 may attach relevant discussions on the social community to the document. The user interface server application 116 may organize the filtered search results based on predefined rules, for example based on relevance, source, and/or correctness of the search results. The user interface server application 116 may transmit the filtered search results to the user interface 110 in the determined order. Additionally, the user interface server application 116 may notify relevant subject matter expert(s) of the question if no answer is found.

Figure 2A:
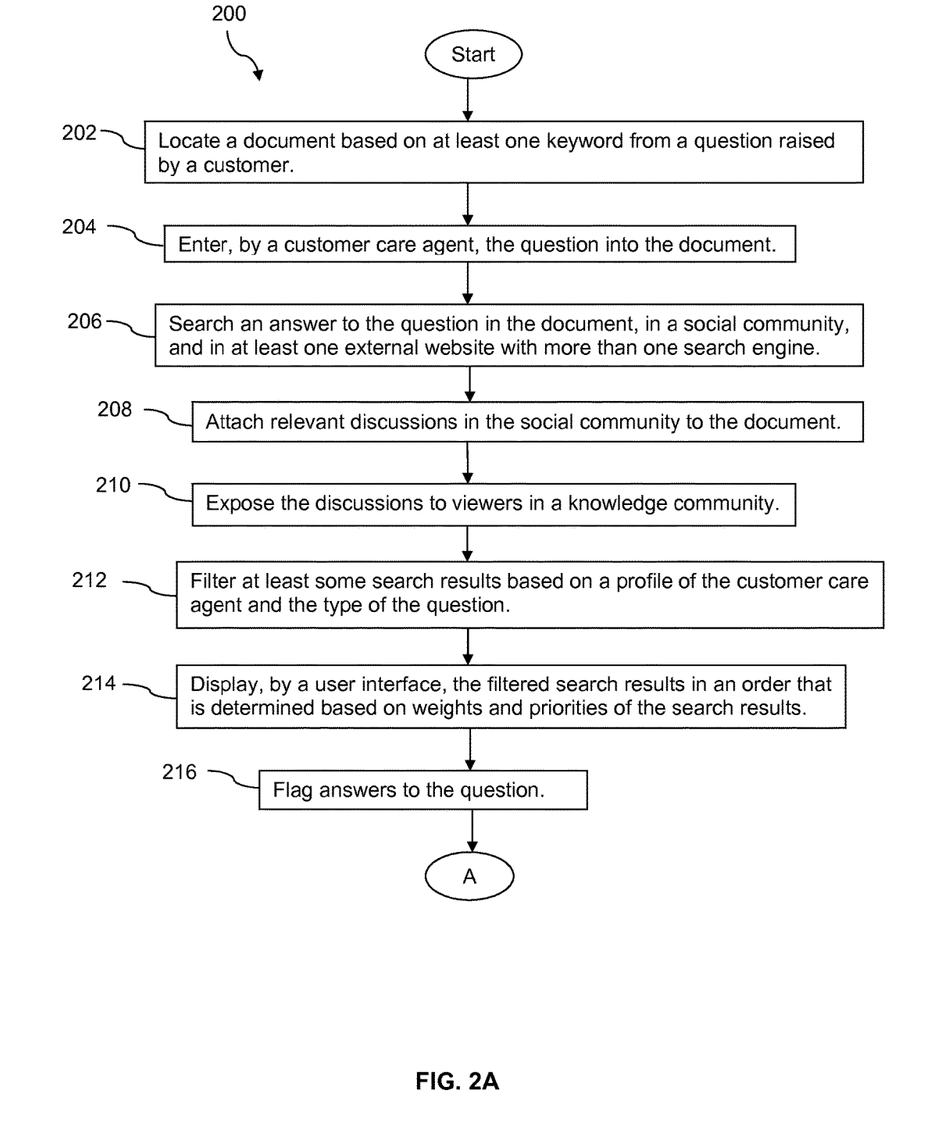
FIG. 2A and FIG. 2B is a flow chart illustrating a method according to an embodiment of the disclosure.
Figure 2B:
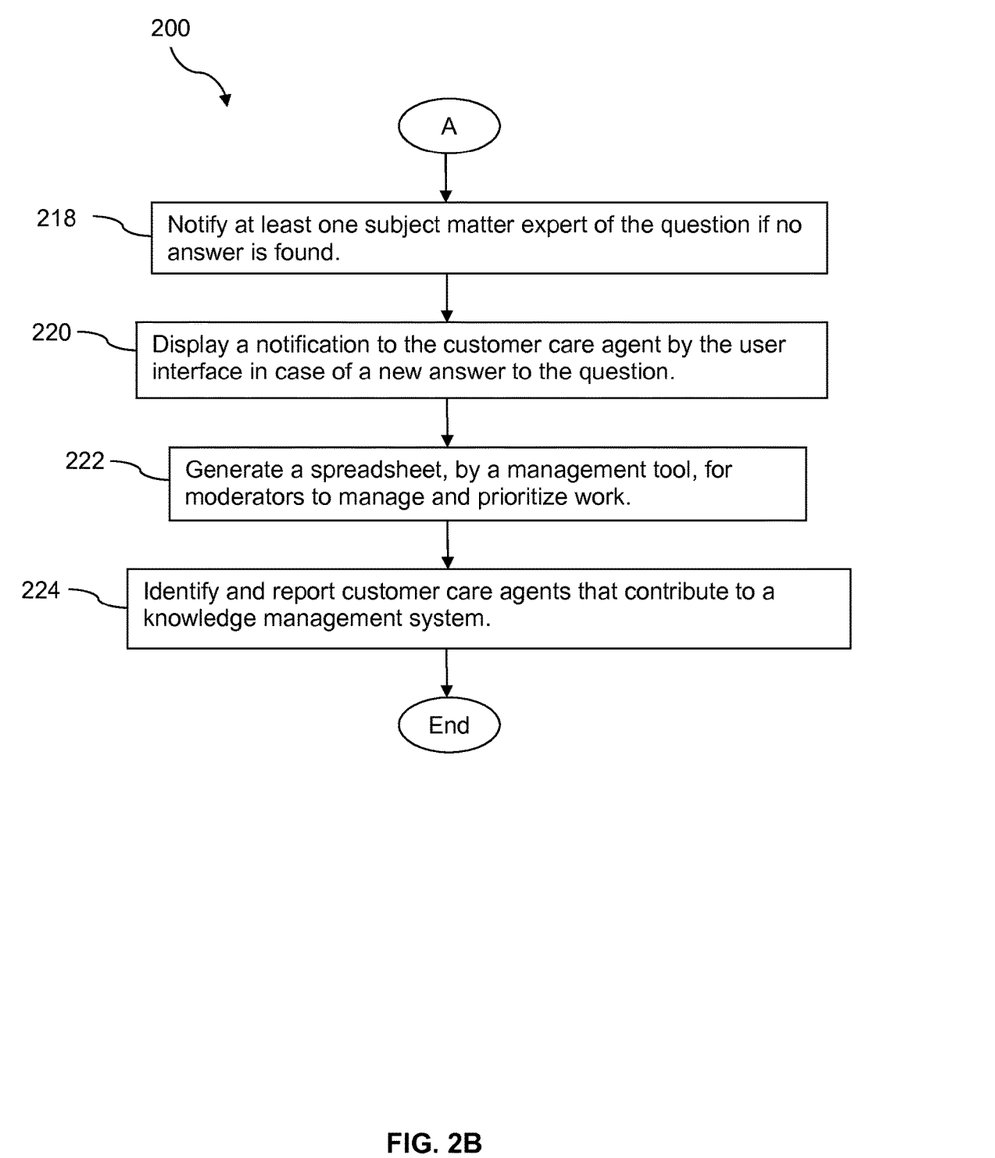

Turning now to FIG. 2, a method 200 is described. At block 202, a document is located based on at least one keyword from a question raised by a customer. For example, when a customer contacts customer care with a question, the customer care agent 108 may locate a document through a user interface 110 on a workstation 112 based on keyword(s) from the question raised by the customer. The customer care agent 108 may be a call center agent, a social care agent, an email agent, or another type of customer care agent. At block 204, the question is entered by a customer care agent into the document. For example, the agent 108 may enter the question to the document that was found via the user interface 110. At block 206, an answer to the question is searched for in the document, in a social community, and in at least one external website with more than one search engine. For example, an answer to the question may be searched for in the document, in a social community (e.g. i-Share), and across websites. In an embodiment, more than one search engine 114 may be utilized to search across both internal and external websites for the answer to the question. At block 208, relevant discussions on the social community are attached to the document. For example, previous relevant discussions on the social community may be found and attached to the document. Relevant discussions on the same topic may be aggregated on the social community, for example after the voice session between the caller and the agent 108 ends. Additionally, when no correct answer is found and no discussion is found on the social community related to the question, a live discussion may be created by the agent 108 on the social community to discuss the question, for example with a subject matter expert.

At block 210, the discussions are exposed to viewers in a knowledge community. For example, the discussions are exposed to all viewers in the customer care system that is also a knowledge community. In an embodiment, the discussions are visible to all the customer care agents 108 in the customer care system. At block 212, at least some search results are filtered based on a profile of the customer care agent and the type of the question. For example, some search results for the question may be filtered based on a profile of the agent 108 that entered the question and the type of the question. A profile of an agent may describe work related information on the agent, for example his or her working group, his or her expertise field, or another type of work related information. For example, if the agent 108 is a customer care agent for prepaid mobile devices, search results for postpaid mobile devices may not be displayed to the agent 108. As another example, if the agent 108 works in the Android system group, search results for iPhone systems may not be displayed to the agent 108. Additionally, if the agent 108 has expertise in tablet issues, search results for smart phones may not be displayed to the agent 108.

At block 214, the filtered search results are displayed by a user interface in an order that is determined based on weights and priorities of the search results. For example, the filtered search results may be displayed by the user interface 110 in an order that is determined based on weights and priorities of the search results. In an embodiment, the weights of the search results may be determined with predefined rules. The priorities of the search results may be determined based on the source of the search results. For example, if a piece of content is provided by a member of a knowledge management team of the customer care system, the content may be treated with top priority. A piece of content created by staff outside the knowledge management team that is marked as a correct answer may be treated with elevated priority. Answers marked as helpful are treated with normal priority. Answers marked as correct or helpful may be further validated by corresponding staff, for example a subject matter expert.

At block 216, answers to the question are flagged. For example, answers to the question may be flagged by staff from the knowledge management team, for example based on sources, relevance, and/or correctness. For example, the answers may be flagged as correct or helpful based on relevance or correctness. At block 218, at least one subject matter expert of the question is notified if no answer is found. For example, relevant subject matter expert(s) may be notified if no answer is found to the question, and the subject matter expert(s) may join a discussion with the agent 108 on the social community. The subject matter expert(s) may answer the question during the discussion. If the subject matter expert(s) could not answer the question, posts may be made to the discussion after the discussion with the subject matter expert(s) ends. At block 220, a notification is displayed to the customer care agent by the user interface in case of a new answer to the question. The agent 108 may subscribe to a topic, for example when no answer is found during the voice session between the agent 108 and the customer. When a new answer is posted on the social community, a notification may be sent to the agent 108 and may be displayed by the user interface 110. For example, a second customer care agent 108 may have experience with the topic and may post a new reply to the topic. The agent 108 may receive a notification when the second agent 108 posts a new reply to the question. The agent 108 may then contact the customer when a correct answer appears and is validated.

At block 222, a spreadsheet is generated by a management tool for moderators to manage and prioritize work. For example, the spreadsheet may comprise statistics and specific information on solved questions and unsolved questions of different categories and of different priority levels. Moderators from different departments may determine which questions to work on first based on the information on the spreadsheet. At block 224, customer care agents that contribute to a knowledge management system are identified and reported. For example, customer care agents 108 that contribute to the knowledge management system may be identified and reported. The customer care agents 108 may be further rewarded with virtual points, virtual badges, achievement levels, the filling of a progress bar, virtual currency, or another type of virtual award.

Figure 3:
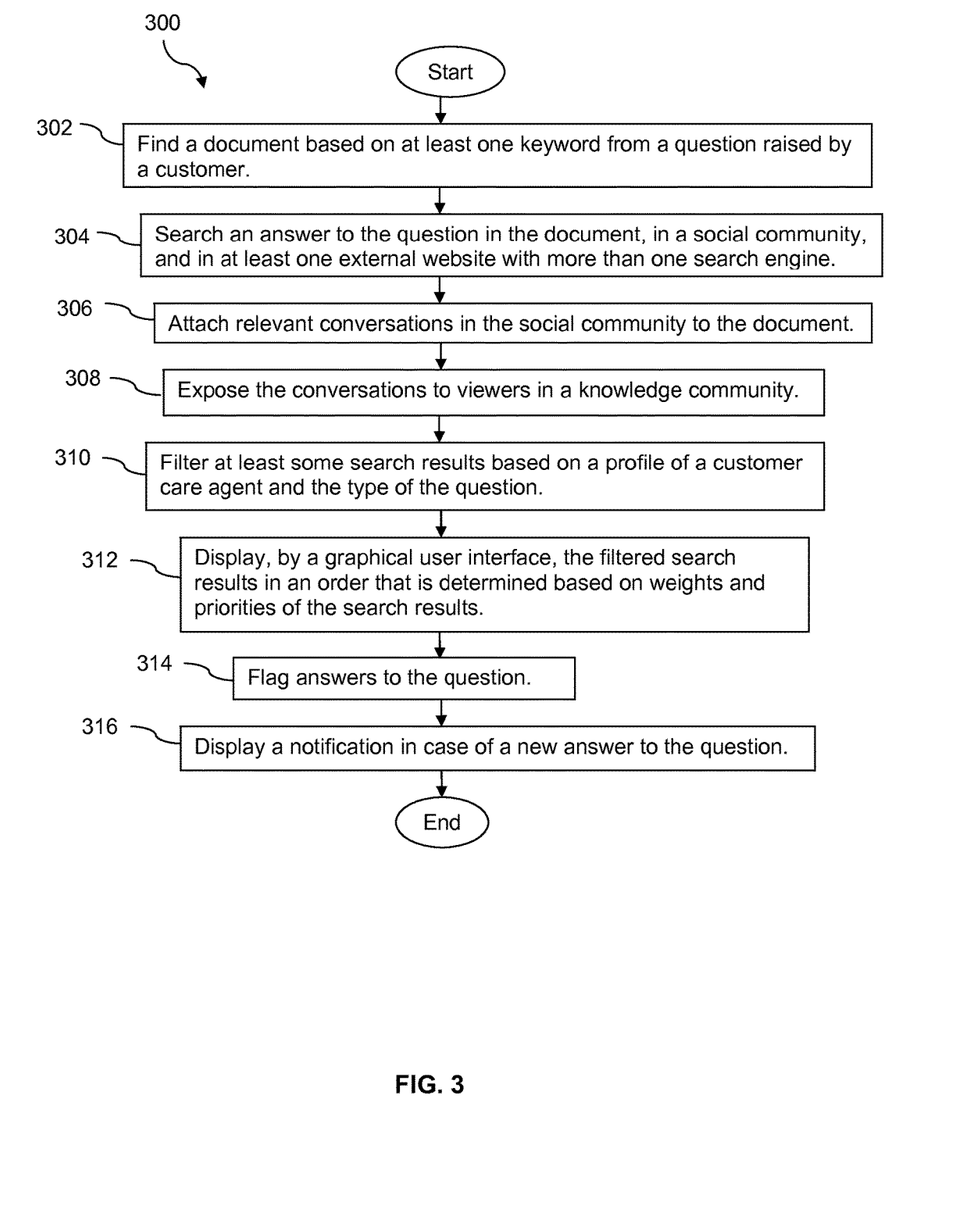
FIG. 3 is a flow chart illustrating another method according to an embodiment of the disclosure.

Turning now to FIG. 3, a method 300 is described. At block 302, a document is found based on at least one keyword from a question raised by a customer. For example, when a customer calls the customer care system, a document may be found through a user interface 110 based on keyword(s) from a question raised by the customer. At block 304, an answer to the question is searched for in the document, in a social community, for example i-Share, and in at least one external website with more than one search engine 114. At block 306, relevant conversations on the social community are attached to the document. For example, relevant conversations on the social community may be attached to the document so that a customer care agent 108 that handles the customer care voice session may view the relevant conversations from the document.

At block 308, the conversations are exposed to viewers in a knowledge community. In an embodiment, all customer care agents 108 in the customer care system may have the right to view the conversations. At block 310, at least some search results are filtered based on a profile of a customer care agent 108 and the type of the question. At block 312, the filtered search results are displayed by a graphical user interface 110 in an order that is determined based on weights and priorities of the search results. At block 314, answers to the question are flagged. At block 316, a notification is displayed in case of a new answer to the question.

Figure 4:
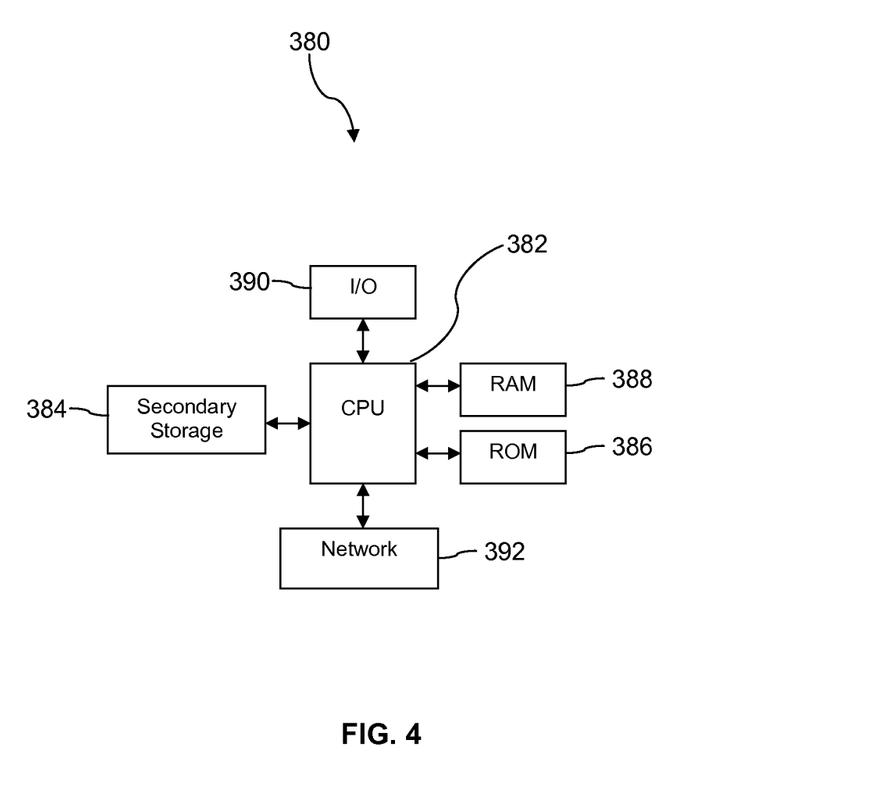
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A customer care knowledge management system, comprising:
   a workstation of a customer care agent, comprising:
   a user interface application that,
   locates a document based on input of at least one keyword from a problem raised by a customer,
   displays filtered search results to the problem in an order that is determined based on weights and priorities of the search results, and
   displays a notification in case of a new answer to the problem; and
   a server computer in communication with the workstation of the customer care agent via a network, comprising:
   more than one search engine, configured to:
   search an answer to the problem in the document, in a social community, and in at least one external website, wherein a social community is a computer managed online social community, and
   a user interface server application, configured to:
   combine search results from the more than one search engine,
   attach relevant discussions in the social community to the document for viewing of the relevant discussions by the customer care agent via the workstation during a voice session with the customer, wherein a discussion is an aggregation of at least one of comments, replies, or posts about at least one of a topic, an issue, or a subject matter,
   filter at least some search results based on a profile of the customer care agent and the type of the problem, and
   notify at least one subject matter expert of the problem if no answer is found.

2. The system of claim 1, wherein the search results from different sources are marked with corresponding different icons.

3. The system of claim 1, wherein the search results are flagged based on relevance and source.

4. The system of claim 3, wherein the search results flagged as correct are further validated.

5. The system of claim 1, wherein search results are ranked by priority and are displayed in priority order.

6. The system of claim 1, wherein posts on the social community relevant to at least one of the keyword or the problem are aggregated in a temporal order under one discussion.

7. The system of claim 1, wherein the document is created, viewed, and edited through a social community tool and wherein the social community tool is part of the user interface application.

8. The system of claim 7, wherein problems are posted through the social community tool and wherein comments are read through the social community tool.

9. A method of managing knowledge for a customer care system, comprising:
   locating, by a user interface application executing on a workstation of a customer care agent, a document for the customer care agent based on at least one keyword from a question entered into the customer care system, wherein a document is a searchable and annotatable electronic document;
   entering, by the customer care agent via a user interface of the workstation of the customer care agent, the question into the document;
   searching an answer to the question in the document, in a social community, and in at least one external website with more than one search engine, wherein a social community is a computer managed online social community;
   attaching, by a user interface server application executing on a server computer in communication with the workstation of the customer care agent via a network, relevant discussions on the social community to the document for viewing of the relevant discussions by the customer care agent via the workstation during a voice session with a customer, wherein a discussion is an aggregation of at least one of comments, replies, or posts about one of a topic, an issue, or a subject matter;
   exposing the relevant discussions to viewers in a knowledge community;
   filtering at least some search results based on a profile of the customer care agent and the type of the question;
   displaying, by the user interface of the workstation, the filtered search results in an order that is determined based on weights and priorities of the search results;
   flagging answers to the question;
   notifying at least one subject matter expert of the question if no answer is found;
   displaying a notification to the customer care agent by the user interface of the workstation in response to receiving a new answer to the question;
   generating a spreadsheet, by a management tool, for moderators to manage and prioritize work; and
   identifying and reporting customer care agents that contribute to a knowledge management system.

10. The method of claim 9, wherein the research results are displayed for the customer care agent to choose from.

11. The method of claim 9, wherein the customer care agents that contribute to the knowledge management system are rewarded with points, achievement levels, the filling of a progress bar, or virtual currency.

12. The method of claim 11, wherein the search results are flagged by staff based on relevance, source, and correctness.

13. The method of claim 9, wherein the customer care agent enters the question into the document during the voice session with the customer.

14. The method of claim 9, wherein new posts of the discussion displayed with the document are identified since the last visit of the customer care agent.

15. The method of claim 9, wherein the user interface server application is a customer service tool user interface server application.

16. A method of dynamically searching for content in a customer care system, comprising:
   finding, by a user interface application executing on a workstation of a customer care agent, a document for the customer care agent based on at least one keyword from an input question;
   searching an answer to the question in the document, in a social community, and in at least one external website with more than one search engine, wherein a social community is a computer managed online social community, and wherein the more than one search engine comprises at least two of a Kana search engine, an i-Share search engine, or another search engine;

attaching, by a user interface server application executing on a server computer in communication with the workstation of the customer care agent via a network, relevant discussions on the social community to the document for viewing of the relevant discussions by the customer care agent via the workstation during a voice session with a customer, wherein a discussion is an aggregation of comments, replies, or posts on a topic, an issue, or a subject matter;

exposing the discussions to viewers in a knowledge community;

filtering at least some search results based on a profile of a customer care agent and the type of the question;

displaying, by a user interface of the workstation, the filtered search results in an order that is determined based on weights and priorities of the search results;

flagging answers to the question; and displaying a notification in case of a new answer to the question.

17. The method of claim 16, wherein the answer is searched across a Kana data store, a wireless distribution system (WDS) data store, a device known issues data store, and an i-Share document data store.

18. The method of claim 16, wherein customer care agents that contribute to the knowledge community are rewarded with virtual badges.

19. The method of claim 16, wherein new posts of the discussions from the social community that are displayed with the document are identified since the last visit of the customer care agent.

* * * * *